June 19, 1923.

R. G. BRUNER

WEEDER

Filed July 29, 1921

1,459,139

Inventor

Reuben G. Bruner,

By

Attorneys

Patented June 19, 1923.

1,459,139

UNITED STATES PATENT OFFICE.

REUBEN G. BRUNER, OF WINDSOR, ONTARIO, CANADA.

WEEDER.

Application filed July 29, 1921. Serial No. 488,316.

*To all whom it may concern:*

Be it known that I, REUBEN G. BRUNER, a citizen of the United States of America, residing at Windsor, in the county of Essex and Province of Ontario, Canada, have invented certain new and useful Improvements in Weeders, of which the following is a specification, reference being had therein to the accompanying drawings.

In the operation of a weeding machine of the type herein disclosed, advantage is taken of the fact that the tops of the plants to be weeded, such as onions or the like, have few or no lateral offshoots in contradistinction to the weeds which usually have branching or bushing tops, so that the weeds are readily caught and lifted without disturbance of the plants themselves. Furthermore a crop to be weeded has its seed planted deeper than the weed seed, therefore, as the weeding machine yieldably tills the soil, scraping the earth towards a row of growing plants, the soil is well agitated and all sprouted weed seed and growing weeds are uprooted and cast aside. The cultivated plants being rooted deeper and devoid of foliage, remain unharmed and are actually benefited by the cultivation.

The machine, by which such results are attained, has weeding members to encounter the row and weeds along the latter, as the machine is advanced, and provision is made for the proper clearing of the weeding members from lifted plants with as simple mechanism as possible in order to decrease the draft of the machine render it lighter and less complicated and make it more desirable for ordinary use.

My invention further aims to provide a weeding machine wherein the weeding instrumentalities are supported to rotate about an axis at a right angle to the direction in which the machine is moved, and each weeding instrumentality is supported so that it may yield to a certain degree when engaging and uprooting weeds, but immediately after the weeding instrumentalities leave the soil there is a snap-like or sudden action of the weeding instrumentalities which causes the weeds held thereby to be discharged and the weeding instrumentalities cleaned. The construction entering into this part of my invention is very important as it obviates the necessity of manually removing weeds from the instrumentality and it is practically impossible for clods of earth and other matter to render the weeding instrumentalities inoperative.

My invention further aims to provide a weeding machine having yieldable weeding members and novel means for regulating the yieldability of the members, which makes it possible for an operator to secure a strong or weak resistance of the members when encountering the soil. This is essential on account of soil conditions and an operator may meet the varying requirements when necessary.

My invention will hereinafter be considered and then claimed, and reference will now be had to the drawing, wherein Figure 1 is a plan of the weeding machine with the handle bars thereof partly broken away;

Figure 1:
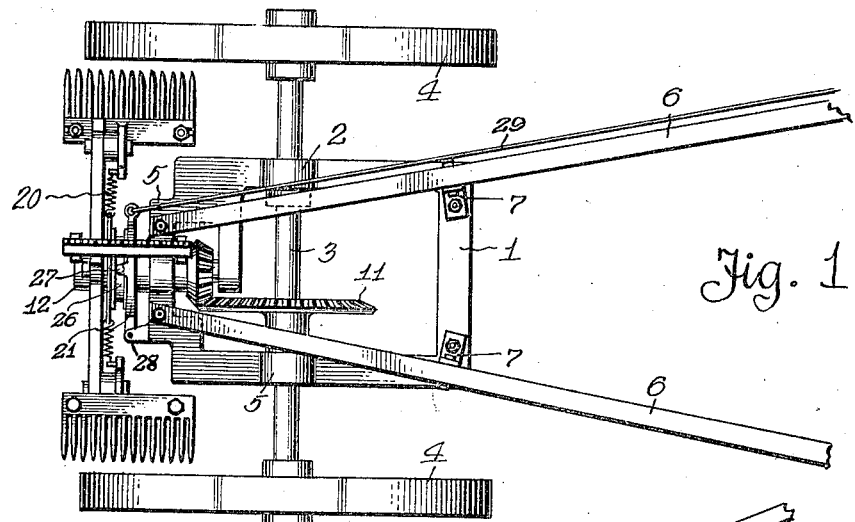
Figure 2:
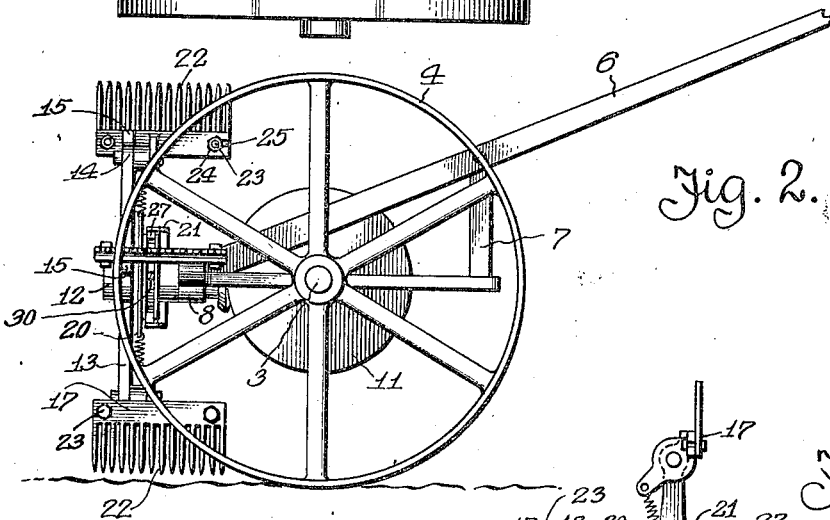
Fig. 2 is a side elevation of the machine.

In the drawing, the reference numeral 1, denotes a substantially rectangular frame provided with bearings 2, and in said bearings is journaled a shaft 3 having its ends provided with fixed traction wheels 4 so that when said wheels are moved over the ground, the shaft 3 will be revolved in its bearings.

At the forward side of the frame 1 is an extension 5 to which is connected diverging and upwardly extending handle bars 6, said handle bars being supported relative to the rear side of the frame 1 by braces 7 suitably secured to said handle bars and to the frame 1. It is through the medium of these handle bars that the weeding machine may be manually moved and the frame 1 tilted on the shaft 3.

On the forward extension 5 of the frame 1 is a bearing 8 for a longitudinally disposed countershaft 9 and the rear end of said countershaft has a small beveled gear wheel 10 meshing with a large beveled gear wheel 11, mounted on the shaft 3, so that the countershaft 9 may be driven when the machine is moved.

Figure 3:
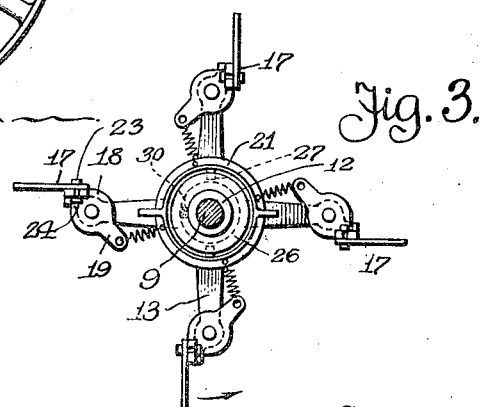
Fig. 3 is a cross sectional view of a portion of the machine, showing the oscillatory yieldable weeding devices.
Figure 4:
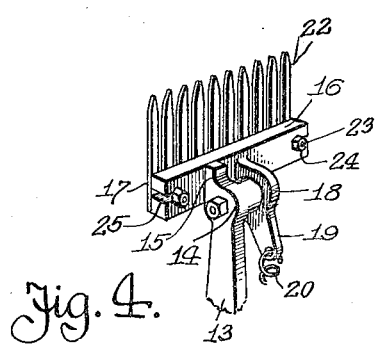
Fig. 4 is a perspective view of one of the devices.

Suitably mounted on the forward end of the countershaft 9 is the hub portion 12 of a spider having radially disposed arms 13 and this spider is adapted to be revolved in a plane at a right angle to the longitudinal central plane of the machine. The outer ends of the spider arms 13 terminate in suitable bearings 14 and stops 15, as best shown in Fig. 4. Pivotally supported at the bearings 14 are detachable oscillatory and yieldable weeding devices, each comprising a cross head 16, a comb 17, and a support 18. The support 18 is intermediate the ends of the cross head 16 and is pivotally supported at the bearings 14 so that it may oscillate, but to maintain the cross head 16 normally in engagement with the stop 15, said support has a crank portion 19 connected by a coiled retractile spring 20 to a member or spool 26 slidable on the hub portion 12 of the spider, as best shown in Fig. 3. The coiled retractile springs 20 have the inner convolutions thereof connected to the spool 26 so that the retractile force of said springs may be increased or decreased, and for this purpose the spool 26 is engaged by opposed studs 27 of a pivoted ring 21 about the spool 26. The ring 21 has one side thereof pivoted to the frame extension 5, as at 28, and the opposite side of the ring is attached to a rod or cable 29 extending to a handle of one of the bars 6, so that the operator of the weeding machine may, at will, regulate the action or yieldability of the weeding members. A permanent adjusting of the springs may be attained by providing the spool 26 with a screw 30, turning the spool and then fixing it to the hub 12.

The comb 17 has tines 22 projecting from the cross head 16 and the body or back of the comb is detachably connected to the cross head by bolts 23 and nuts 24, said bolts extending through slots 25 in the ends of the cross head.

From the foregoing it will be observed that all of the combs are disposed in parallel longitudinal planes and that the combs are successively brought into action. With the spider revolving in the direction indicated by the arrow in Fig. 3, it is possible for the comb to yield when encountering the soil, but the yielding of said comb places the retractile springs 20 under additional tension, so that when the weeds are eventually loosened and uprooted and the comb leaves the soil, there will be a sudden and snap-like action of the same, which causes the weeds to be discharged from the comb. Of course this takes place after the combs have loosened the weeds and the action of the oscillatory weeding devices not only dislodges the weeds but cast the same aside from growing plants.

As pointed out in the beginning, this weeding machine may be advantageously used in removing weeds from rows of such growing vegetables, as onions, where the tops of the plants are of such a nature that the comb tines may enter the plant top without it materially injuring the same. When moving the weeding machine from one place to another, the frame 1 is tilted, through the medium of the handle bars 6, so that the weeding devices will be supported above the ground and not interfere with the movement of the machine.

One embodiment of my invention has been illustrated, but it is to be understood that the structural elements are susceptible to such variations and modifications as fall within the scope of the appended claims.

What I claim is:—

1. In a weeding machine, weeding devices, a spider supporting said weeding devices, springs connected to said weeding devices and adapted to allow said weeding devices to yield relative to said spider, and means connected to said springs and movable co-axial of said spider for placing said springs under additional tension when the weeding devices encounter deeply rooted weeds.

2. In a weeding machine having yieldable weeding devices to which springs are attached to permit of said devices yielding:—means for increasing and decreasing the tension of said springs, said means comprising a slidable spool to which said springs are connected, and means operatable from a remote point for sliding said spool.

3. In a weeding machine, having yieldable weeding devices to which springs are attached to permit of said devices yielding:—means for increasing and decreasing the tension of said springs, said means comprising a slidable spool to which said springs are connected, a pivot ring about said spool adapted to move said spool, and means connected to said ring and operatable from a distance for shifting said ring and adjusting said spool.

4. In a weeding machine wherein weeding devices are supported to revolve in a plane at an angle to the direction in which the machine is moved:—means for yieldably holding said weeding devices, said means comprising a slidable member, springs connecting said devices to said member, and pivotal means adapted to slide said member to increase and decrease the tension of said springs.

In testimony whereof I affix my signature in presence of two witnesses.

REUBEN G. BRUNER.

Witnesses:
ANNA M. DORR,
KARL H. BUTLER.